US012610121B2

(12) United States Patent　　　　　　(10) Patent No.:　US 12,610,121 B2
Huang　　　　　　　　　　　　　　　　　 (45) Date of Patent:　　Apr. 21, 2026

(54) CAMERA MODULE AND ELECTRONIC DEVICE

(71) Applicant: AAC Optics (Nanning) Co., Ltd., Nanning (CN)

(72) Inventor: Tiantian Huang, Nanning (CN)

(73) Assignee: AAG Optics (Nanning) Co., Ltd., Nanning (CN)

( * ) Notice: Subject to any disclaimer, the term of this patent is extended or adjusted under 35 U.S.C. 154(b) by 135 days.

(21) Appl. No.: 18/544,529

(22) Filed: Dec. 19, 2023

(65) Prior Publication Data

US 2024/0340519 A1　　Oct. 10, 2024

Related U.S. Application Data

(63) Continuation of application No. PCT/CN2023/087391, filed on Apr. 10, 2023.

(51) Int. Cl.
*H04N 23/57*　　　　(2023.01)
*G02B 7/02*　　　　 (2021.01)
*G03B 30/00*　　　　(2021.01)

(52) U.S. Cl.
CPC ............. *H04N 23/57* (2023.01); *G02B 7/023* (2013.01); *G03B 30/00* (2021.01)

(58) Field of Classification Search
CPC ........ G02B 7/023; G03B 30/00; H04N 23/54; H04N 23/55; H04N 23/57
See application file for complete search history.

(56) References Cited

U.S. PATENT DOCUMENTS

| | | | | |
|---|---|---|---|---|
| 2010/0134678 A1* | 6/2010 | Xu | ......................... | G03B 17/00 |
| | | | | 348/340 |
| 2017/0357144 A1* | 12/2017 | Kim | ...................... | H04N 23/55 |
| 2020/0348479 A1* | 11/2020 | Kwon | .................... | G03B 17/12 |

FOREIGN PATENT DOCUMENTS

| | | | | | |
|---|---|---|---|---|---|
| CN | 115866379 A | * | 3/2023 | ............. | G03B 30/00 |
| WO | WO-2017080432 A1 | * | 5/2017 | ............. | H04N 23/57 |

* cited by examiner

*Primary Examiner* — Antoinette T Spinks
(74) *Attorney, Agent, or Firm* — Wiersch Law Group

(57)　　　　　　　ABSTRACT

In a camera module and an electronic device, a lens assembly is provided with at least one connection portion, a stand body sleeved outside the lens assembly is provided with at least one first guide groove running through the stand body and a transmission portion, and a housing is provided with a second guide groove in an inner wall of the housing. The connection portion runs through the first guide groove and then is engaged and secured into the second guide groove. A drive assembly drives, via the transmission portion, the stand body to rotate. When being rotated, the stand body guides the connection portion to move relatively between two ends of the first guide groove, such that the lens assembly moves along the second guide groove, and hence the lens assembly is stuck outside the housing and is retracted back to the inner of the housing.

20 Claims, 7 Drawing Sheets

CAMERA MODULE AND ELECTRONIC DEVICE

CROSS REFERENCE TO RELATED APPLICATIONS

This application is a continuation of PCT Patent Application No. PCT/CN2023/087391, filed Apr. 10, 2023, which is incorporated by reference herein in its entirety.

TECHNICAL FIELD

The present disclosure relates to the technical field of camera with a telephoto lens, and in particular, relates to a camera module and an electronic device.

BACKGROUND

With the advancement of camera technologies, camera modules have been widely applied in various electronic devices like smart phones and tablet computers. When capturing details of objects from a distance or capturing subjects that are difficult to approach, it is necessary to use a camera module with a telephoto lens.

Commonly, a camera module with a telephoto lens employs a periscopic camera structure, as illustrated in FIG. 1. This structure typically includes a lens module, a prism module situated on one side of the lens module, and a sensor configured to receive light reflected from the prism module. Incident light undergoes folding through the prism module and is then transmitted to the sensor. The sensor for photosensing is typically arranged along a thickness direction of the electronic device. The periscopic camera structure, employing a prism assembly for reflection, tends to cause considerable light attenuation. Moreover, the size of the sensor cannot exceed the thickness of the electronic device, which is unfavorable for enhancing a photographic effect.

Therefore, it is desired to provide a new technical solution to solve the above technical problem.

SUMMARY

The embodiments of the present disclosure provide a camera module and an electronic device, which are capable of solving the problem of a poor photographic effect in the related art.

In one aspect, a camera module is provided. The camera module includes: a housing having an accommodation chamber, a lens assembly arranged in the accommodation chamber and movable with respect to the housing, a support guide assembly arranged in the accommodation chamber and configured to support the lens assembly and guide the lens assembly to move, and a drive assembly arranged in the accommodation chamber and configured to drive the support guide assembly to rotate to drive the lens assembly to move along an optical axis direction. The support guide assembly includes a stand body sleeved outside the lens assembly, at least one first guide groove running through the stand body, and a transmission portion arranged on the stand body and engaged with the drive assembly. Two ends of a respective first guide groove of the at least one first guide groove go away from each other in the optical axis direction. The lens assembly includes a connection portion engaged with the respective first guide groove, and the housing is provided with a second guide groove engaged with the connection portion in an inner wall of the housing, and an extension direction of the second guide groove is parallel to the optical axis direction.

As an improvement, a plurality of first guide grooves and a plurality of connection portions are provided, the plurality of first guide grooves are in one-to-one correspondence to the plurality of connection portions, and one second guide groove or a plurality of second guide grooves are provided.

As an improvement, the plurality of connection portions are evenly arranged along a circumferential direction of the lens assembly.

As an improvement, the housing includes a substrate configured to carry the support guide assembly and the drive assembly, and a shell engaged with the substrate, and the substrate and the shell enclose to define the accommodation chamber.

As an improvement, the stand body includes a cylindrical portion provided with the at least one first guide groove and an edge portion bent outward from a side, close to the substrate, of the cylindrical portion, and the transmission portion is formed at an outer edge of the edge portion, and includes a serrated structure extending at least partially along a circumferential direction of the edge portion.

As an improvement, the drive assembly includes a motor, a first gear connected to an output shaft of the motor, and a second gear meshed with both the first gear and the serrated structure.

As an improvement, the substrate is provided with a mounting port, and the camera module further includes a photosensitive assembly arranged in the mounting port.

As an improvement, the photosensitive assembly includes a photosensitive chip opposite to the lens assembly, a first printed circuit board electrically connected to the photosensitive chip, and a chip carrier arranged at the mounting port and configured to support the photosensitive chip and the first printed circuit board.

As an improvement, the camera module further includes an elastic support assembly arranged between the substrate and the lens assembly, and a projection of the elastic support assembly on the substrate along the axial direction is not overlapped with the mounting port.

In another aspect, an electronic device is provided. The electronic device includes the camera module as described above.

The present disclosure achieves the following beneficial effects. In the camera module and the electronic device according to the present disclosure, the lens assembly is provided with at least one connection portion, and a stand body sleeved outside the lens assembly is provided with at least one first guide groove running through the stand body and a transmission portion, and a housing is provided with a second guide groove in the inner wall of the housing. The connection portion runs through the first guide groove and then is engaged and secured into the second guide groove, two ends of the first guide groove go away from each other in the optical axis direction, and the extension direction of the second guide groove is parallel to the optical axis direction. The drive assembly drives, via the transmission portion, the stand body to rotate. When being rotated, the stand body guides the connection portion of the lens assembly to move relatively between the two ends of the first guide groove, such that the lens assembly moves along the second guide groove, and hence the lens assembly is stuck outward to the outside of the housing along the optical axis direction and is retracted back to the inner of the housing along the optical axis direction. When the lens assembly is stuck outward to the outside of the housing, shooting is carried out by using a telephoto lens, and incident light is not reflected by a prism such that attenuation of the incident light is prevented; and in the meantime, the sizes of the components in the camera module are not subject to restrictions of the thickness of the electronic device, and thus it is favorable to improving the photographic effect.

DETAILED DESCRIPTION OF THE EMBODIMENTS

Figure 1:
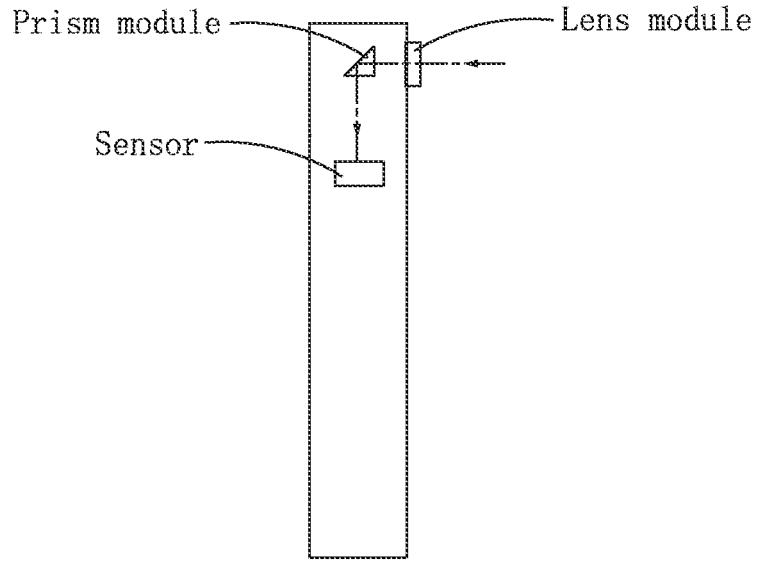
FIG. 1 is a schematic diagram illustrating a periscopic camera structure in the related art.

Embodiments of the present disclosure are described in detail hereinafter. Examples of the embodiments are shown in the accompanying drawings, where the identical or similar reference signs denote the identical or similar elements or elements having the identical or similar functions. The embodiments described with reference to the attached drawings are all exemplary, and are intended to illustrate and interpret the present disclosure, which shall not be construed as causing limitations to the present disclosure.

For better understanding of the technical solutions according to the embodiments of the present disclosure by a person skilled in the art, the technical solutions of the present disclosure are clearly and completely described with reference to the accompanying drawings of the embodiments of the present disclosure. Obviously, the embodiments described herein are merely exemplary ones, but are not all the embodiments of the present disclosure. Based on the embodiments of the present disclosure, all other embodiments derived by a person skilled in the art without any creative efforts shall fall within the protection scope of the present disclosure.

In the embodiments of the present disclosure, the phrase "at least one" refers to one or more, and the phrase "a plurality of" indicates two or more than two. In the description of the present disclosure, the terms "first", "second," and "third" are merely for the differential illustration purpose, and shall not be construed as indicating or implying a relative importance.

The phrase "an embodiment" or "some embodiments" described in this specification refers to incorporating specific features, structures, or characteristics described in one or multiple embodiments of the present disclosure. Therefore, terms such as "comprising," "including," "having," and their variations imply "including but not limited to," unless specifically emphasized otherwise.

It should be noted that in the description of the embodiments of the present disclosure, the term "and/or" is merely an association relationship for describing associated objects, which represents that there may exist three types of relationships, for example, A and/or B may represent three situations: only A exists, both A and B exist, and only B exists.

It should be noted that in the embodiments of the present disclosure, the term "connection" may be understood as electrical connection, where the connection between two electrical components can be either a direct or an indirect connection. For example, the connection between A and B may be a direct connection or an indirect connection involving one or multiple other electrical components between A and B.

An embodiment of the present disclosure provides a camera module 100. Referring to FIG. 2 to FIG. 7, the camera module 100 includes a housing 10, a lens assembly 20, a support guide assembly 30, and a drive assembly 40. The housing 10 has an accommodation chamber 13. The lens assembly 20 is disposed in the accommodation chamber 13, and is movable with respect to the housing 11. The support guide assembly 30 and the drive assembly 40 are both disposed in the accommodation chamber 13. The support guide assembly 30 is configured to support the lens assembly 20 and guide the lens assembly 20 to move. The drive assembly 40 is configured to drive the support guide assembly 30 to rotate to drive the lens assembly 20 to move along an optical axis direction.

The optical axis direction is an extension direction of an optical axis 101.

The housing 10 is provided with an opening 14 opposite to the lens assembly 20. When moving along the optical axis direction, the lens assembly 20 is capable of being partially stuck out of the housing 10 through the opening 14 and being retracted into the accommodation chamber 13 in the housing 10 through the opening 14.

The lens assembly 20 includes at least one connection portion 21 defined in an outer surface of the lens assembly 20.

The support guide assembly 30 includes a stand body 31 sleeved outside the lens assembly 20, at least one first guide groove 32 running through the stand body 31, and a transmission portion 33 disposed on the stand body 31 and engaged with the drive assembly 40. Two ends of the first guide groove 32 go away from each other in the extension direction of the optical axis 101. The first guide groove 32 includes a first end 321 and a second end 322. The first end 321 is arranged on a side, away from the opening 14, of the stand body 31. The second end 322 is arranged on a side, close to the opening 14, of the stand body 31. The first guide groove 32 extends between the first end 321 and the second end 322. An extension direction of the first guide groove 32 is not parallel to the optical axis direction.

The connection portion 21 of the lens assembly 20 is engaged with the first guide groove 32. A second guide groove 15 engaged with the connection portion 21 is arranged in an inner wall of the housing 10. An extension direction of the second guide groove 15 is parallel the optical axis direction. The connection portion 21 runs through the first guide groove 32, and is then engaged with the second guide groove 15. The second guide groove 15 includes a third end 151 away from the opening 14, and a fourth end 152 close to the opening 14.

Figure 2:
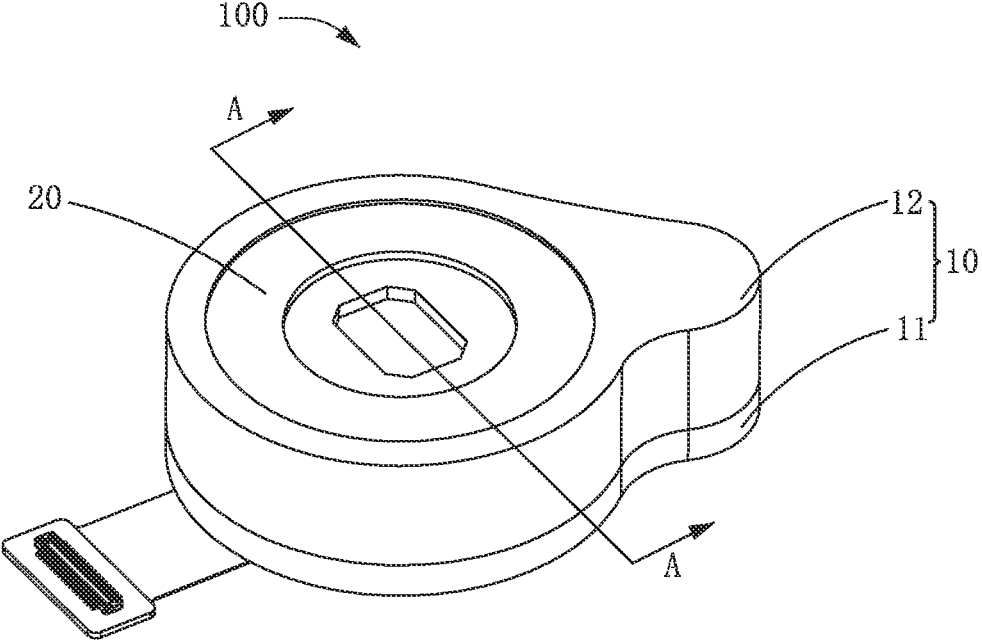
FIG. 2 is a schematic diagram illustrating a perspective view of a camera module in which a telephoto lens is not in use according to an embodiment of the present disclosure.
Figure 3:
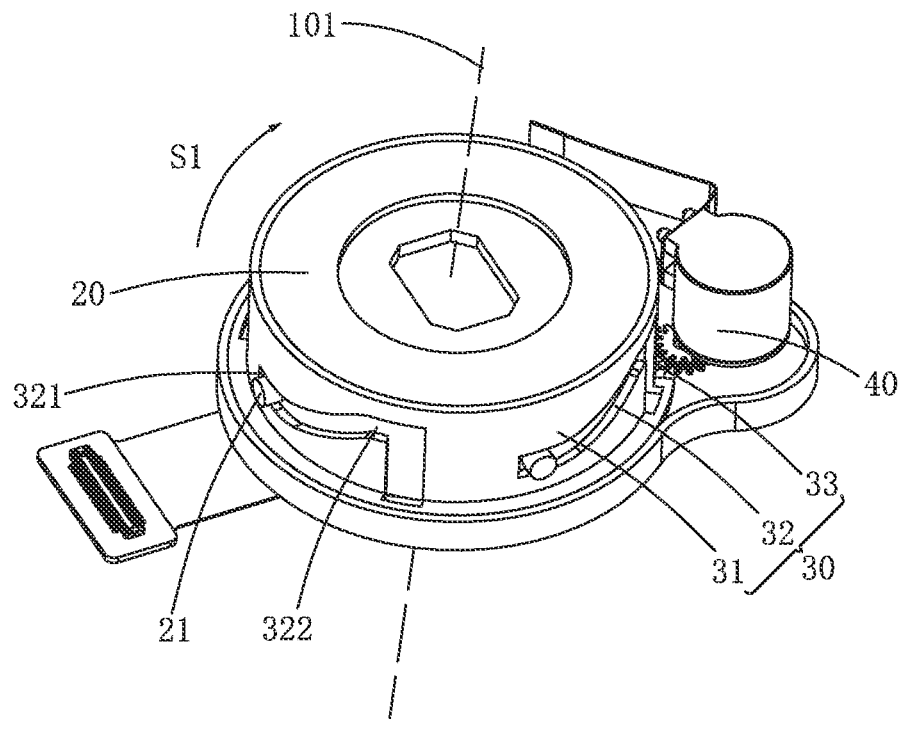
FIG. 3 is a schematic diagram illustrating an internal structure of a camera module in which a telephoto lens is not in use according to an embodiment of the present disclosure.
Figure 4:
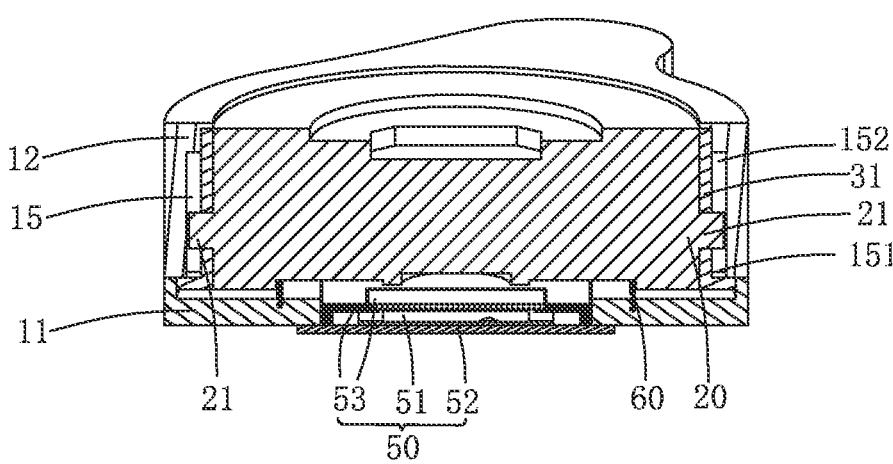
FIG. 4 is a schematic diagram illustrating a sectional view of the camera module in FIG. 2 taken along an A-A' line.

Referring to FIG. 2 and FIG. 3, the camera module 100 in which a telephoto lens is not in use is illustrated. In this case, the connection portion 21 is situated at the first end 321 of the first guide groove 21 and the third end 151 of the second guide groove 15, and the lens assembly 20 is retracted into the accommodation chamber 13.

Figure 8:
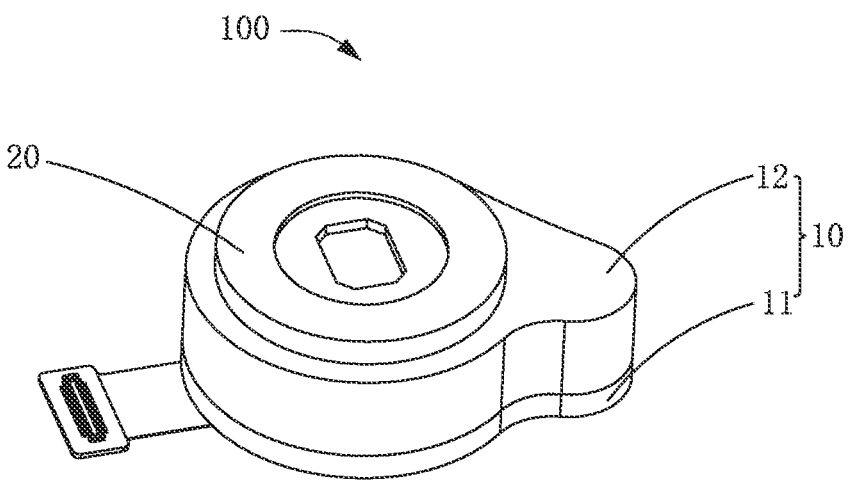
FIG. 8 is a schematic diagram illustrating a perspective view of a camera module in which a telephoto lens is in use according to an embodiment of the present disclosure.
Figure 9:
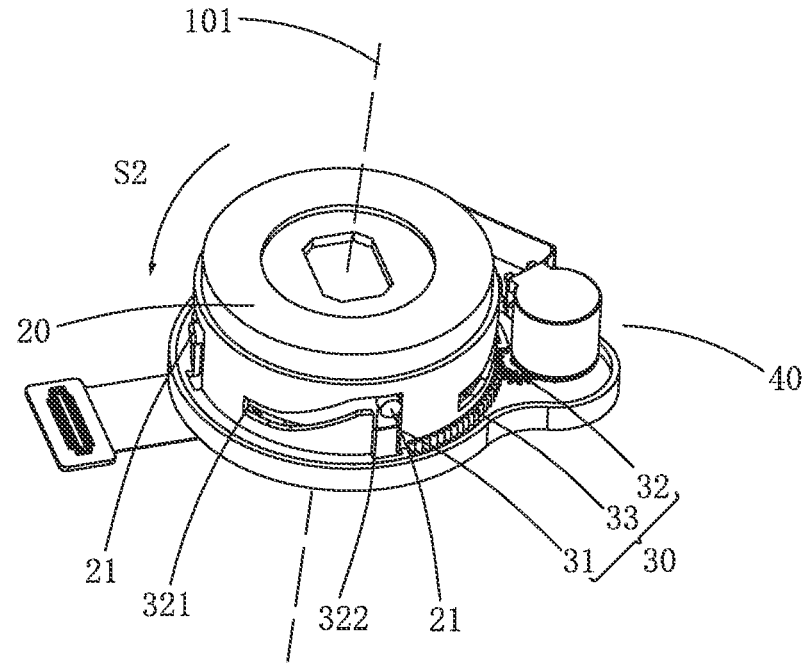
FIG. 9 is a schematic diagram illustrating an internal structure of a camera module in which a telephoto lens is in use according to an embodiment of the present disclosure.

When the drive assembly 40 drives, via the transmission portion 33, the stand body 31 to rotate along a first direction S1, since the connection portion 21 is engaged and secured into the second guide groove 15, the lens assembly 20 may not be rotated with rotation of the stand body 31. During rotation of the stand body 31 along the first direction S1, the first guide groove 32 moves with respect to the connection portion 21, such that a relative position of the first connection portion 21 is changed from the first end 321 to the second end 322 of the first guide groove 32. Meanwhile, the connection portion 21 moves along the second guide groove 15 towards the opening 14, and the connection portion 21 moves from the third end 151 to the fourth end 152. Referring to FIG. 8 and FIG. 9, the camera module 100 in which a telephoto lens is in use is illustrated. In this case, the connection portion 21 is situated at the second end 322 of the first guide groove 21 and the fourth end 152 of the second guide groove 15, and the lens assembly 20 is partially stuck out of the housing 10.

Referring to FIG. 9, when the drive assembly 40 drives, via the transmission portion 33, the stand body 31 to rotate along a second direction S2, since the connection portion 21 is engaged and secured into the second guide groove 15, the lens assembly 20 may not be rotated with rotation of the stand body 31. During rotation of the stand body 31 along the second direction S2, the first guide groove 32 moves with respect to the connection portion 21, such that a relative position of the first connection portion 21 is changed from the second end 322 to the first end 321 of the first guide groove 32. Meanwhile, the connection portion 21 moves along the second guide groove 15 towards a direction away from the opening 14, and the connection portion 21 moves from the fourth end 152 to the third end 151. In this case, the camera module returns back to a state in which the telephoto lens is not in use, as shown in FIG. 2 and FIG. 3.

In this embodiment, the lens assembly is provided with at least one connection portion, sleeved onto the lens assembly is provided with the first guide groove arranged to run through the stand body and the transmission portion, the housing is provided with the second guide groove in the inner wall, the connection portion runs through the first guide groove and then is engaged and secured into the second guide groove, the two ends of the first guide groove go away from each other in the optical axis direction, the extension direction of the second guide groove is parallel to the optical axis direction, the drive assembly drives, via the transmission portion, the stand body to rotate, when being rotated, the stand body guides the connection portion of the lens assembly to move relatively between the two ends of the first guide groove, such that the lens assembly moves along the second guide groove, and hence the lens assembly is partially stuck outward to the outside of the housing in the optical axis direction and is retracted back to the inner of the housing in the optical axis direction. When the lens assembly is stuck outward to the outside of the housing, shooting is carried out by using a telephoto lens, and incident light is not reflected by a prism such that attenuation of the incident light is prevented. In addition, the sizes of the components of the camera module are not subject to restrictions of the thickness of the electronic device, and thus it is favorable to improving the photographic effect.

In an embodiment, one first guide groove 32 may be arranged, one connection portion 21 may be arranged, and one second guide groove 15 may be arranged.

In an embodiment, a plurality of first guide grooves 32, a plurality of second guide grooves 15, and a plurality of connection portions 21 are arranged. In this case, the plurality of first guide grooves 32 are in one-to-one correspondence to the plurality of connection portions 21, and the plurality of second guide grooves 15 are in one-to-one correspondence to the plurality of connection portions 21.

In an embodiment, a plurality of first guide grooves 32 and a plurality of connection portions 21 may be arranged, and the plurality of first guide grooves 32 are in one-to-one correspondence to the plurality of connection portions 21. one second guide groove or a plurality of second guide grooves 15 are arranged and the number of second guide grooves 15 may be less than the number of first guide grooves 32. In this case, not all the connection portions 21 correspond to second guide grooves 15.

In an embodiment, the plurality of connection portions 21 are evenly arranged along a circumferential direction of the lens assembly 20.

In an embodiment, the connection portion 21 may be a columnar protrusion.

In an embodiment, the lens assembly 20 may be a lens system. The lens system includes a lens barrel and one lens or a plurality of lenses arranged in the lens barrel.

Figure 5:
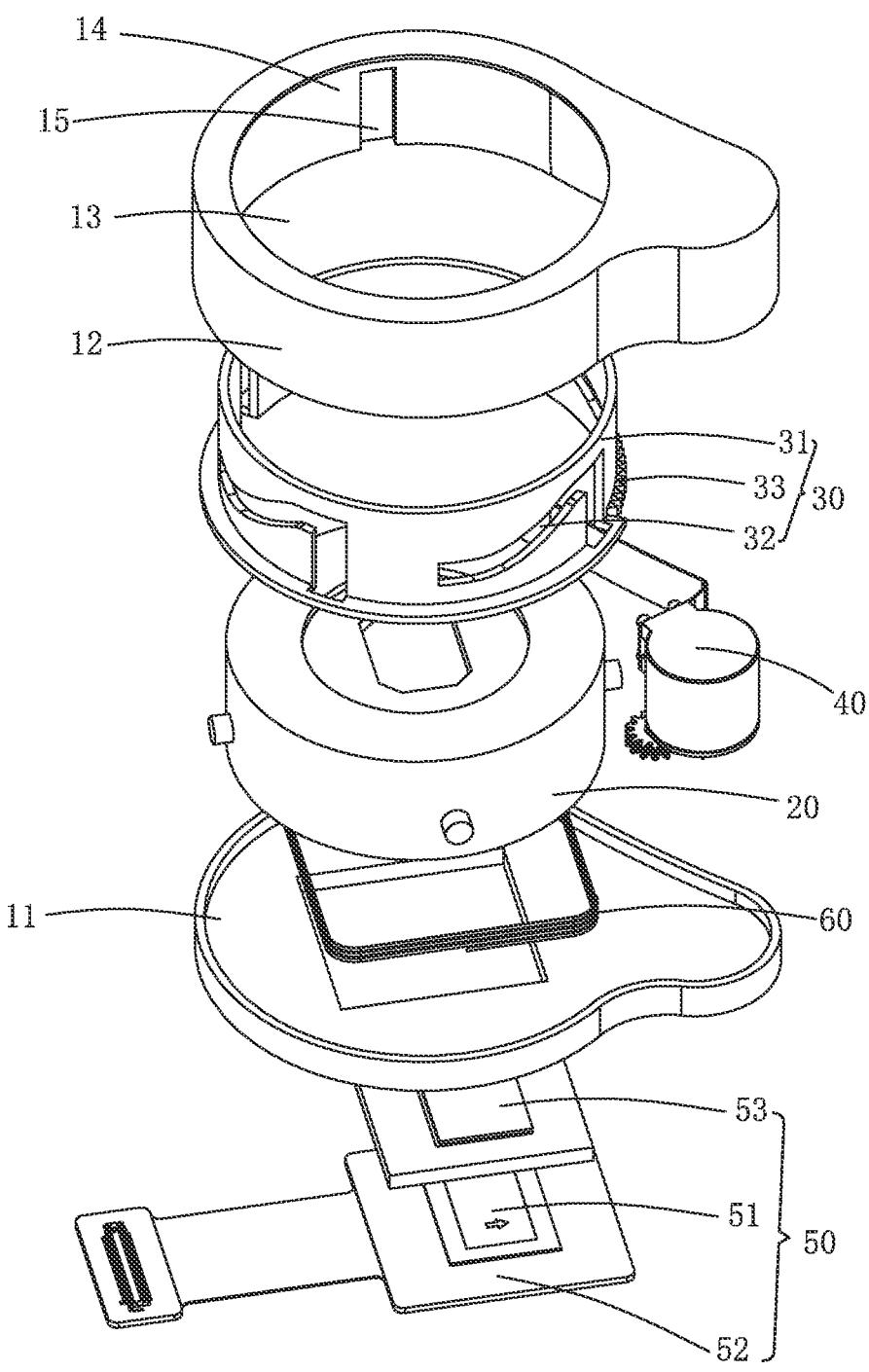
FIG. 5 is a schematic diagram illustrating an exploded structure of a camera module according to an embodiment of the present disclosure.

In an embodiment, referring to FIG. 2, FIG. 3, and FIG. 5, the housing 10 includes a substrate 11 and a shell 12. The shell 12 is provided with the opening 14. The substrate 11 is configured to carry the support guide assembly 30 and the drive assembly 40. The shell 12 is engaged with the substrate 11. The substrate 11 and the shell 12 enclose to define the accommodation chamber 13. The second guide groove 15 is situated in an inner wall of the shell 12.

In an embodiment, the support guide assembly 30 further includes mounting grooves 34 running through the stand body 31 and in one-to-one correspondence to the first guide grooves 32. The mounting groove 34 is connected to the second end 322 of the first guide groove 32. An extension direction of the mounting groove 34 is parallel to the optical axis direction. In this embodiment, when the stand body 31 is assembled with the lens assembly 20, the connection portion 21 is inserted from one end, away from the opening 14, of the mounting groove 34, the connection portion 21 moves along the mounting groove 34 to a side where the mounting groove 34 is connected to the second end 322; and then the lens assembly 20 and the stand body 31 are rotated with respect to each other, such that the connection portion 21 enters the first guide groove 32 from the second end 322.

In an embodiment, the stand body 31 includes a cylindrical portion 311 provided with the first guide groove 32 and an edge portion 312 bent outward from a side, close to the substrate 11, of the cylindrical portion 311. The transmission portion 33 is formed at an outer edge of the edge portion 312, and the transmission portion 33 includes a serrated structure 331 extending at least partially along a circumferential direction of the edge portion 312.

In some embodiments, the substrate 11 may include a first connection portion 111 engaged with the support guide assembly 30 and a second connection portion 112 engaged with the drive assembly 40. The first connection portion 111 may be in a circular shape engaged with the edge portion 312. The transmission portion 33 including the serrated structure 331 may be situated in a section, close to the second connection portion 112, of the first connection portion 111, such that the transmission portion 33 is connected to the drive assembly 40. Correspondingly, the shell 12 has a shape matching the substrate 11. In this embodiment, the portion, where the support guide assembly 30 is arranged, of the housing 10 has a shape matching the edge portion 312, such that the stand body 31 is capable of being rotated about the optical axis 101 in the accommodation chamber 13.

Figure 7:
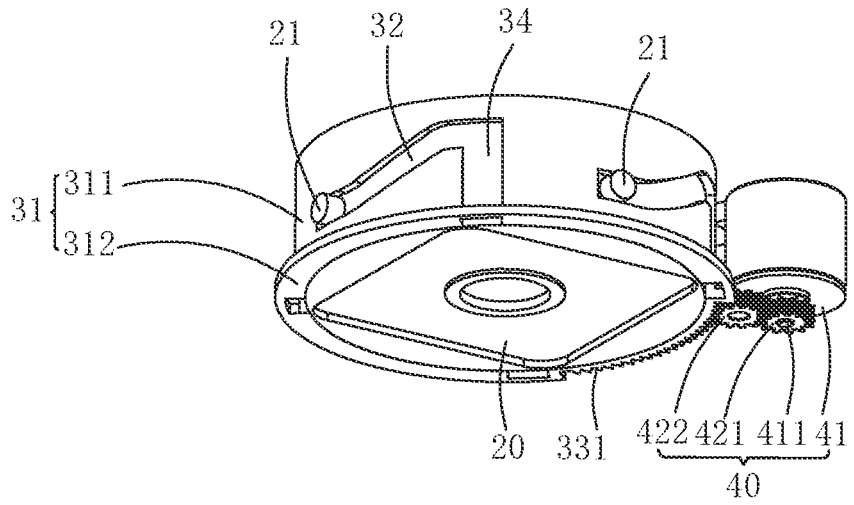
FIG. 7 is a schematic diagram illustrating engagement between a lens assembly, a support guide assembly and a drive assembly of a camera module according to an embodiment of the present disclosure.

In some embodiments, referring to FIG. 7, the drive assembly 40 includes a motor 41 having an output shaft 411, a first gear 421 connected to the output shaft 411 of the motor 41, and a second gear 422 meshed with both the first gear 421 and the serrated structure 331. The output shaft 411 of the motor 41 is rotated to drive the first gear 421 to rotate, and thus the second gear 422 meshed with the first gear 421 is rotated to drive the serrated structure 331 meshed with the second gear 422 to rotate. Eventually, the stand body 31 is driven to rotate.

Figure 6:
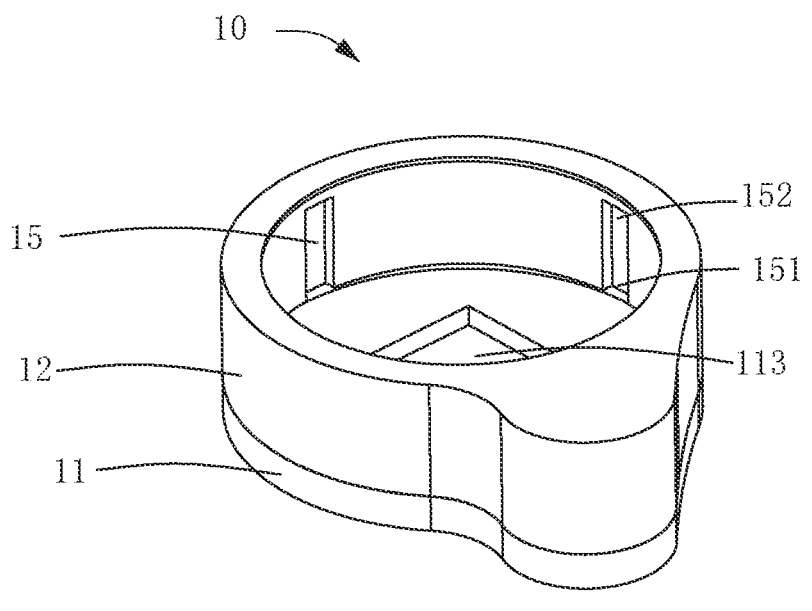
FIG. 6 is a schematic diagram illustrating a structure of a housing of a camera module according to an embodiment of the present disclosure.

In an embodiment, referring to FIG. 5 and FIG. 6, the substrate 11 is provided with a mounting port 113, and the camera module 100 further includes a photosensitive assembly 50 arranged at the mounting port 113. In this embodiment, incident light enters the lens assembly 20 from one side of the opening 14, and exit light from the lens assembly 20 is received by the photosensitive assembly 50.

Figure 10:
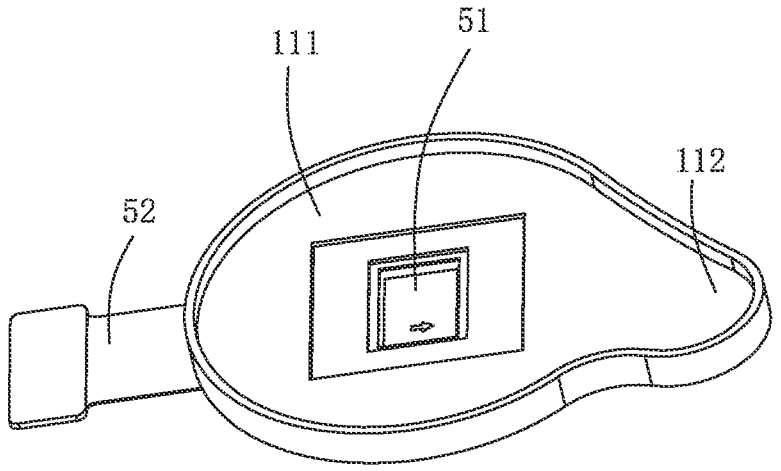
FIG. 10 is a schematic diagram illustrating engagement between a substrate and a photosensitive assembly of a camera module according to an embodiment of the present disclosure.

In some embodiments, referring to FIG. 5 and FIG. 10, the photosensitive assembly 50 includes a photosensitive chip 51 opposite to the lens assembly 20, a first printed circuit board 52 electrically connected to the photosensitive chip 51, and a chip carrier 53 arranged at the mounting port 113 and configured to support the photosensitive chip 51 and the first printed circuit board 52.

In an embodiment, referring to FIG. 5 and FIG. 10, the camera module 100 according to this embodiment further includes an elastic support assembly 60 arranged between the substrate 11 and the lens assembly 20. A projection of the elastic support assembly 60 on the substrate 11 along the optical axis direction is not overlapped with the mounting port 113. In this embodiment, when the camera assembly 100 is in a state in which the telephoto lens is in use, the lens assembly 20 is away from the substrate 11. In this case, the elastic support assembly 60 may support the lens assembly 20, and may also serve as a collision deterrent to prevent the lens assembly 20 from colliding with the substrate 11 in the process of approaching the substrate 11, so as to protect the photosensitive chip 51 arranged on the substrate 11.

In some embodiments, the elastic support assembly 60 may be a spring.

In some embodiments, the first printed circuit board 52 may be a rigid-flexible printed circuit board.

Figure 11:
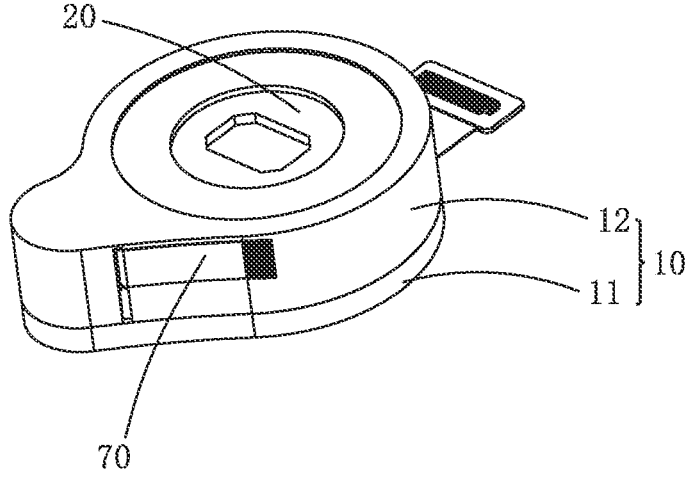
FIG. 11 is a schematic diagram illustrating a structure of a camera module according to an embodiment of the present disclosure.
Figure 12:
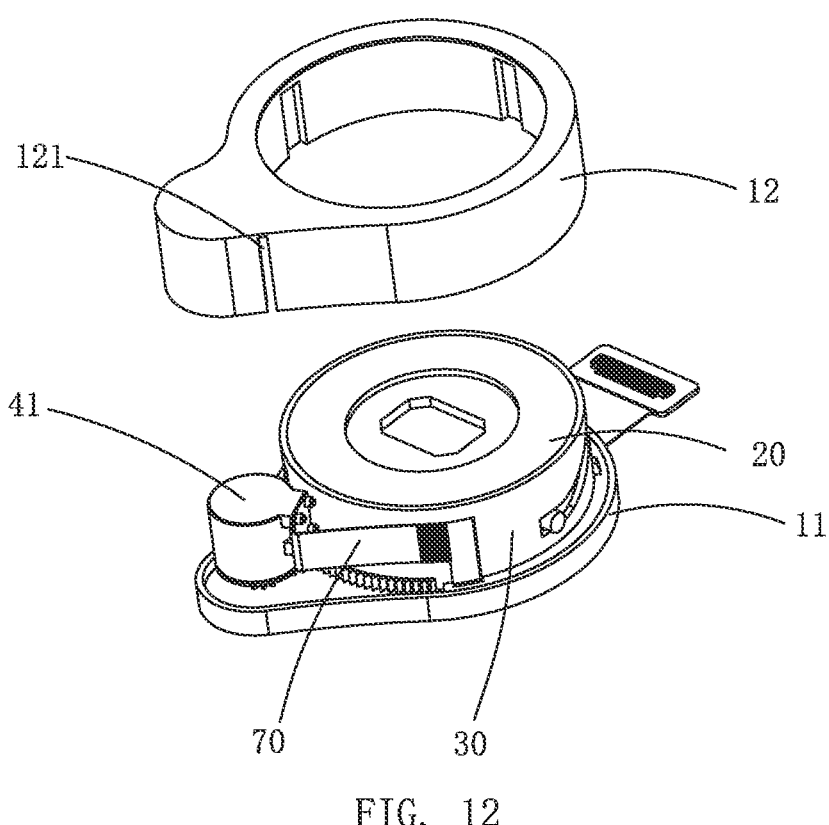
FIG. 12 is a schematic diagram illustrating another structure of a camera module according to an embodiment of the present disclosure.

In some embodiments, referring to FIG. 11 and FIG. 12, a second mounting port 121 is arranged in a side surface of the shell 12, and the camera module 100 further includes a second printed circuit board 70 electrically connected to the motor 41. The second printed circuit board 70 extends out of the housing 10 through the second mounting port 121.

In some embodiments, the second printed circuit board 70 may be a flexible printed circuit board.

Figure 13:
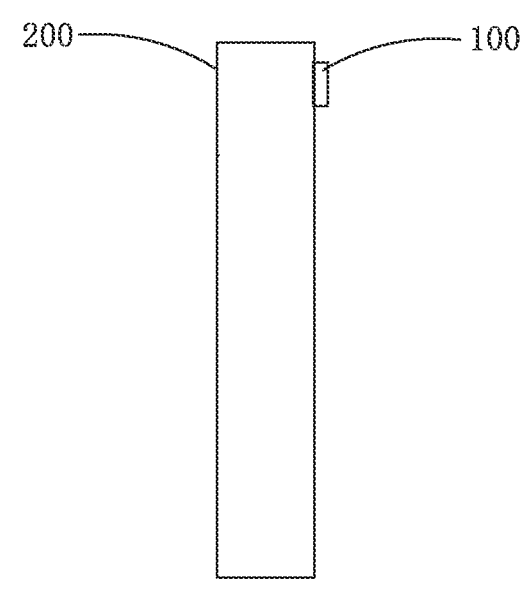
FIG. 13 is a schematic diagram illustrating a structure of an electronic device according to an embodiment of the present disclosure.

An embodiment of the present disclosure provides an electronic device 200. Referring to FIG. 13, the electronic device 200 includes a device body 201 and the camera module 100 arranged in the device body 21.

The electronic device 200 may be, but is not limited to, a display, a smart wearable device, a mobile phone, or a smart home device. The smart wearable device includes, but is not limited to, a smart watch, a smart bracelet, or a neck massager. The mobile terminal includes, but is not limited to, a smart phone, a laptop computer, a tablet computer, or the like.

Described above are merely exemplary embodiments of the present disclosure. It should be noted that persons of ordinary skill in the art would make various improvements without departing from the inventive concept of the present disclosure, and such improvements shall fall within the protection scope of the present disclosure.

What is claimed is:

1. A camera module, comprising:
a housing, having an accommodation chamber;
a lens assembly, arranged in the accommodation chamber and movable with respect to the housing;
a support guide assembly, arranged in the accommodation chamber and configured to support the lens assembly and guide the lens assembly to move; and
a drive assembly, arranged in the accommodation chamber and configured to drive the support guide assembly to rotate to drive the lens assembly to move along an optical axis direction,
wherein the support guide assembly includes:
a stand body, sleeved outside the lens assembly;
at least one first guide groove, running through the stand body; and a
transmission portion, arranged on the stand body and engaged with the drive assembly,
wherein two ends of a respective first guide groove of the at least one first guide groove go away from each other in the optical axis direction; and
wherein the lens assembly includes a connection portion engaged with the respective first guide groove, the housing is provided with a second guide groove engaged with the connection portion in an inner wall of the housing, and an extension direction of the second guide groove is parallel to the optical axis direction;
wherein the connection portion runs through the first guide groove and is engaged and secured into the second guide groove, the drive assembly drives, via the transmission portion, the stand body to rotate; when being rotated, the stand body guides the connection portion of the lens assembly to move relatively between the two ends of the first guide groove while the connection portion moving along the second guide groove, such that the lens assembly moves along the second guide groove.

2. The camera module according to claim 1, wherein a plurality of first guide grooves and a plurality of connection portions are provided, the plurality of first guide grooves are in one-to-one correspondence to the plurality of connection portions, and one second guide groove or a plurality of second guide grooves are provided.

3. The camera module according to claim 2, wherein the plurality of connection portions are evenly arranged along a circumferential direction of the lens assembly.

4. The camera module according to claim 1, wherein the housing includes:

a substrate, configured to carry the support guide assembly and the drive assembly; and a shell, engaged with the substrate;

wherein the substrate and the shell enclose to define the accommodation chamber.

5. The camera module according to claim 4, wherein the stand body includes:

a cylindrical portion, provided with the at least one first guide groove; and an edge portion, bent outward from a side, close to the substrate, of the cylindrical portion;

wherein the transmission portion is formed at an outer edge of the edge portion, and includes a serrated structure extending at least partially along a circumferential direction of the edge portion.

6. The camera module according to claim 5, wherein the drive assembly includes:

a motor;

a first gear, connected to an output shaft of the motor; and a second gear, meshed with both the first gear and the serrated structure.

7. The camera module according to claim 4, wherein the substrate is provided with a mounting port, and the camera module further includes a photosensitive assembly arranged in the mounting port.

8. The camera module according to claim 7, wherein the photosensitive assembly includes:

a photosensitive chip, opposite to the lens assembly;

a first printed circuit board, electrically connected to the photosensitive chip; and a chip carrier, arranged at the mounting port and configured to support the photosensitive chip and the first printed circuit board.

9. The camera module according to claim 7, further comprising: an elastic support assembly arranged between the substrate and the lens assembly;

wherein a projection of the elastic support assembly on the substrate along the axial direction is not overlapped with the mounting port.

10. The camera module according to claim 1, wherein the lens assembly is a lens system, including a lens barrel and one lens or a plurality of lenses arranged in the lens barrel.

11. An electronic device, comprising:

a device body; and a camera module, arranged in the device body;

wherein the camera module includes:

a housing, having an accommodation chamber;

a lens assembly, arranged in the accommodation chamber and movable with respect to the housing;

a support guide assembly, arranged in the accommodation chamber and configured to support the lens assembly and guide the lens assembly to move; and a drive assembly, arranged in the accommodation chamber and configured to drive the support guide assembly to rotate to drive the lens assembly to move along an optical axis direction, wherein the support guide assembly includes:

a stand body, sleeved outside the lens assembly;

at least one first guide groove, running through the stand body; and a transmission portion, arranged on the stand body and engaged with the drive assembly, wherein two ends of a respective first guide groove of the at least one first guide groove go away from each other in the optical axis direction; and wherein the lens assembly includes a connection portion engaged with the respective first guide groove, the housing is provided with a second guide groove engaged with the connection portion in an inner wall of the housing, and an extension direction of the second guide groove is parallel to the optical axis direction;

wherein the connection portion runs through the first guide groove and is engaged and secured into the second guide groove, the drive assembly drives, via the transmission portion, the stand body to rotate; when being rotated, the stand body guides the connection portion of the lens assembly to move relatively between the two ends of the first guide groove while the connection portion moving along the second guide groove, such that the lens assembly moves along the second guide groove.

12. The camera module according to claim 11, wherein a plurality of first guide grooves and a plurality of connection portions are provided, the plurality of first guide grooves are in one-to-one correspondence to the plurality of connection portions, and one second guide groove or a plurality of second guide grooves are provided.

13. The camera module according to claim 12, wherein the plurality of connection portions are evenly arranged along a circumferential direction of the lens assembly.

14. The camera module according to claim 11, wherein the housing includes:

a substrate, configured to carry the support guide assembly and the drive assembly; and a shell, engaged with the substrate;

wherein the substrate and the shell enclose to define the accommodation chamber.

15. The camera module according to claim 14, wherein the stand body includes:

a cylindrical portion, provided with the at least one first guide groove; and an edge portion, bent outward from a side, close to the substrate, of the cylindrical portion, wherein the transmission portion is formed at an outer edge of the edge portion, and includes a serrated structure extending at least partially along a circumferential direction of the edge portion.

16. The camera module according to claim 15, wherein the drive assembly includes:

a motor;

a first gear, connected to an output shaft of the motor; and a second gear, meshed with both the first gear and the serrated structure.

17. The camera module according to claim 14, wherein the substrate is provided with a mounting port, and the camera module further includes a photosensitive assembly arranged in the mounting port.

18. The camera module according to claim 17, wherein the photosensitive assembly includes:

a photosensitive chip, opposite to the lens assembly;

a first printed circuit board, electrically connected to the photosensitive chip; and a chip carrier, arranged at the mounting port and configured to support the photosensitive chip and the first printed circuit board.

19. The camera module according to claim 17, further comprising:

an elastic support assembly arranged between the substrate and the lens assembly;

wherein a projection of the elastic support assembly on the substrate along the axial direction is not overlapped with the mounting port.

20. The camera module according to claim 11, wherein the lens assembly is a lens system, including a lens barrel and one lens or a plurality of lenses arranged in the lens barrel.

\* \* \* \* \*